United States Patent [19]
Stojic

[11] Patent Number: 5,937,733
[45] Date of Patent: Aug. 17, 1999

[54] SPRING BRAKE ACTUATOR WITH INTERNAL BREATHING CONDUIT

[75] Inventor: Steven M. Stojic, Holland, Mich.

[73] Assignee: NAI Anchorlok International, Inc., Muskegon, Mich.

[21] Appl. No.: 08/965,563

[22] Filed: Nov. 6, 1997

Related U.S. Application Data

[63] Continuation of application No. PCT/US97/01362, Jan. 28, 1997.

[51] Int. Cl.[6] .............................. F01B 7/00; F01B 31/00
[52] U.S. Cl. ...................................... 92/63; 92/110; 92/48
[58] Field of Search ............................. 92/110, 111, 112, 92/130 A, 63

[56] References Cited

U.S. PATENT DOCUMENTS

| | | | |
|---|---|---|---|
| H748 | 3/1990 | Graham | 92/63 |
| 3,406,609 | 10/1968 | Cox | 92/63 |
| 3,896,706 | 7/1975 | Newstead et al. | |
| 4,796,513 | 1/1989 | Hata et al. | |
| 4,889,037 | 12/1989 | Goral et al. | 92/78 |
| 4,890,540 | 1/1990 | Mullins . | |
| 5,263,403 | 11/1993 | Choinski et al. | |
| 5,311,809 | 5/1994 | Choinski et al. | |
| 5,640,893 | 6/1997 | Stojic | 92/63 |
| 5,671,654 | 9/1997 | Plantan | 92/63 |

FOREIGN PATENT DOCUMENTS

| | | |
|---|---|---|
| 19 06 818 | 10/1969 | Germany . |
| 23 41 441 | 2/1975 | Germany . |
| 355037 | 6/1961 | Switzerland . |
| 96/26093 | 9/1996 | WIPO . |

*Primary Examiner*—John E. Ryznic
*Attorney, Agent, or Firm*—Rader, Fishman, Grauer & McGarry

[57] ABSTRACT

A spring brake actuator (10), with a large-force compression spring (82) in a second spring chamber (78) of the housing, has vent openings (100) in the housing communicating with the second spring chamber (78). A filter assembly (134) covers the vent openings (100). Weep holes (62), (104), (102), and (100) in a sleeve (50) of an push rod (18), in a spring brake actuator rod (84), and in a spring brake housing portion (68) together permit fluid compressed in a first service brake chamber (30) to flow through a conduit define by these weep holes out of the brake actuator (10) wherein it is filtered by the filter assembly (134).

25 Claims, 3 Drawing Sheets

SPRING BRAKE ACTUATOR WITH INTERNAL BREATHING CONDUIT

This application is a continuation of application serial no. PCT/US97/01362, filed Jan. 28, 1997.

BACKGROUND OF THE INVENTION

1. Field of the Invention

The invention relates to air-operated diaphragm brakes for vehicles and particularly to combination service and spring brake actuator assemblies.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. An actuating rod extends through the spring brake diaphragm to integrally connect with the pressure plate. In operation, it is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

The spring chamber on the spring side of the spring brake diaphragm is typically vented to the outside atmosphere to allow air to be exhausted from that portion of the housing when the diaphragm is actuated in the direction of the spring to compress the spring brake compression spring in the spring chamber. When the spring expands, the diaphragm is moved in a direction so as to enlarge the spring chamber and outside air is drawn into the spring chamber. Since the spring chamber is vented to the outside atmosphere under the truck chassis, the outside air drawn into the spring chamber is often accompanied by moisture and corrosive substances, such as road salt. Because the spring wears as it cycles and its bare metal becomes exposed as a result, the spring tends to corrode due to contaminants in the air. Also, because the spring brake compression spring must exert substantial force in order to act as an emergency brake, the spring is under great stress when it is compressed. The spring's durability is inversely proportional to the amount of corrosion and stress it experiences. In sealed housings, the spring cannot be removed from the housing without permanently deforming the housing. In other housings, the actuator must be replaced by a new actuator and the old actuator sent to a rebuilder. In any case, the actuator is not serviceable by the truck operator. Thus, when the spring brake compression spring breaks, the entire brake actuating unit must be replaced at substantial cost.

Attempts have been made to seal the spring chamber, including the provision of breather tubes to direct air from the spring chamber to other portions of the brake actuator and internal check valves to provide a one-way flow of air from the interior of the brake actuator to atmosphere. For example, U.S. Pat. Nos. 5,263,403 and 5,311,809 to Choinski et al. disclose a brake actuator having a spring brake chamber and a non-pressurized service brake chamber fluidly interconnected by a breather tube mounted to an external surface of the brake actuator. U.S. Pat. No. 4,890,540 to Mullins discloses a brake actuating unit having a housing provided with a pair of vent holes wherein one of the vent holes is plugged to prevent contaminants from entering the housing. Further, U.S. Pat. No. 3,896,706 to Newstead et al. discloses a brake unit having a tubular piston which includes a vent hole which extends into a spring housing which, in turn, is in communication with a filter at one end of the spring housing. The prior art solutions to the problem of contaminated air entering the spring chamber have proven to be unworkable or costly and complicated to manufacture.

SUMMARY OF THE INVENTION

A brake actuator according to the invention addresses the problem of preventing contaminants from entering the brake actuator housing by providing an internal breathing conduit connecting a service brake housing with a filter which is fluidly connected to a spring brake housing.

In one embodiment, the brake actuator comprises a spring brake actuator housing and a service brake actuator housing, the spring brake actuator housing having a first movable member disposed therein which divides the interior thereof into a first spring brake chamber and a second spring brake chamber. The first movable member is preferably reciprocally movable therein in response to the delivery and exhaust of pressurized fluid to the first spring brake chamber. A spring is disposed in the second spring brake chamber in a position to urge the first movable member to a first position wherein the second spring brake chamber is collapsed upon exhaust of pressurized fluid from the first spring brake chamber. The service brake actuator housing has a second movable member disposed therein which divides the interior thereof into a first service brake chamber and a second service brake chamber. The second movable member is preferably reciprocally movable therein in response to the delivery and exhaust of pressurized fluid to the second service brake chamber. A hollow spring brake actuator rod is operably connected to the first movable member and a service brake actuator rod is operably connected to the second movable member. The service brake actuator rod extends through the service brake actuator housing to connect to a brake. The improvement, according to the invention, is that the service brake actuator housing is sealed and the spring brake actuator housing is sealed except for at least one filtered vent opening in the second spring brake chamber, the service brake actuator rod is hollow with an opening in communication with the first service brake chamber, the spring brake actuator rod is in communication with the second spring brake chamber, and it extends through the second movable member into communication with the service brake actuator rod to vent fluid from the first service brake chamber through the service brake actuator rod and the spring brake actuator rod when the second service brake chamber is pressurized.

The second movable member preferably has an aperture. The service brake actuator rod is preferably anchored to the second movable member and the spring brake actuator rod extends through the aperture into the service brake actuator rod. The service brake actuator rod is preferably press-fit into the second movable member. The second movable member preferably comprises a diaphragm mounted at a peripheral edge thereof to the service brake actuator housing. The second movable member preferably further comprises a pressure plate and wherein the service brake actuator rod is preferably press-fit into the pressure plate. An O-ring seal is preferably disposed between the spring brake actuator rod and the second movable member.

The brake actuator can preferably further comprise a plug disposed in an end of the service brake actuator rod. The spring brake actuator rod preferably extends into the service brake actuator rod far enough to abut the plug and urge the service brake actuator to engage the brake when the first spring brake chamber is evacuated. The opening in the service brake actuator rod is preferably located adjacent the second movable member. At least one weep hole is preferably disposed in each end of the spring brake actuator rod whereby the at least one weep hole in each end of the spring brake actuator rod fluidly connects the interior of the service brake actuator rod with the second spring brake chamber. A caging rod is preferably mounted at a first end to the spring brake actuator housing and extending within the spring brake actuator rod. A second end of the caging rod preferably has a plate thereon. The plate on the second end of the caging rod preferably has at least one passage extending through it. The at least one passage in the plate is preferably disposed inwardly from a peripheral edge of the plate.

In another embodiment, the brake actuator according to the invention preferably has a second movable member comprising a piston. The piston can mount the service brake actuator rod as described herein.

DETAILED DESCRIPTION

Figure 1:
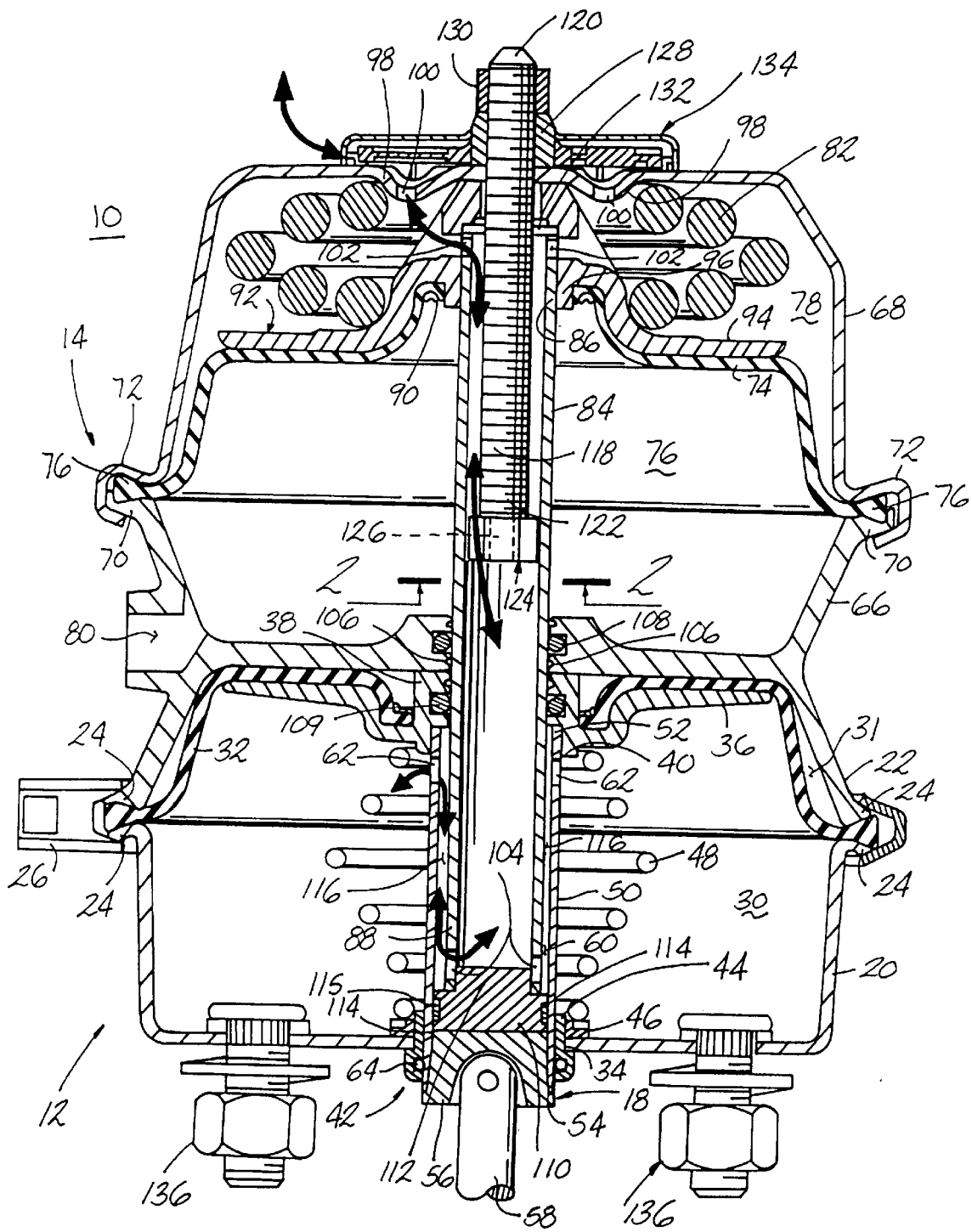
FIG. 1 is a cross-sectional view of a diaphragm-type spring brake actuator with an internal breathing conduit according to the invention.

FIG. 1 shows a cross-sectional view of an air-operated brake actuating unit 10 having a general configuration well known in the art and modified according to the teachings of this invention. The actuating unit 10 comprises a service brake portion 12 mounted in tandem to a spring brake or emergency brake portion 14. A service brake actuator or push rod 18 extends from the service brake 12 and is adapted to operably connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 20 and 22, each having an outwardly directed flange edge 24. The housing sections 20, 22 are clamped together at their flange edges by means of a clamp 26 to form a first service brake chamber 30 and a second service brake chamber 31 on either side thereof. An elastomeric diaphragm 32 is suspended within the inner chamber 30 and is compressed at the peripheral edge thereof between flange edges 24 of the housing sections 20, 22. The housing section 20 is provided with a central opening 34 therein. The service brake push rod 18 extends through the opening 34 in housing section 20 and into the first service brake chamber 30 where it terminates in a pressure plate 36. The pressure plate 36 includes a coaxial cylindrical sleeve 38 having a base 40. A push rod guide 42 is disposed around the central opening 34 and comprises a sleeve 44 having a radially-extending flange thereon which forms a spring seat 46. A compression spring 48 extends between the base 40 of the pressure plate 36 and the spring seat 46 of the push rod guide 42. The push rod guide 42 acts to center the spring 48 around the opening 34.

The service brake push rod 18 comprises an elongated cylindrical sleeve 50 having a first end 52 and a second end 54. The first end 52 of the service brake push rod 18 is mounted to the base 40 of the pressure plate 36. The second end 54 of the service brake push rod 18 is mounted within the sleeve portion 44 of the push rod guide 42 and extends through the central opening 44. The second end 54 is closed off by a plug 56 which mounts a pivotable actuator rod 58, operably connected to a brake assembly (not shown). The sleeve 50 defines an internal chamber 60. The first end 52 further includes several weep holes 62 disposed adjacent the base 40 of the pressure plate 36. An O-ring 64 is located between the push rod guide 42 and the sleeve 50 to provide a seal therebetween. The spring 48 thus tends to urge the pressure plate 36 and the service brake push rod 18 to a fully retracted position shown in FIG. 1.

The spring brake 14 comprises a pair of facing cup-shaped housing sections 66, 68. Housing sections 22, 66 can be formed of an integral cast piece. Housing sections 66 and 68 are each provided with an outwardly directed circumferential flange edge 70 and a peripheral curved edge 72, respectively. The housing sections 66 and 68 are clamped together by means of the curved edge 72 on housing section 68 engaging edge 70 on housing section 66. An elastomeric diaphragm 74 is compressed at a peripheral edge 76 between the edges 70, 72 of the housing sections 66, 68 and divides the interior of the spring brake 14 into a first spring brake chamber 76 and a second spring brake chamber 78. The first spring brake chamber 76 is filled with compressed air typically supplied through an air service port 80 in housing section 66 when the emergency brake is in its normal, released position. The second spring brake chamber 78 contains a large-force spring brake compression spring 82.

An actuator rod 84, aligned with the push rod 18, comprises a cylindrical sleeve which has a proximal end 86 and a distal end 88. The proximal and distal ends 86 and 88 are provided with several weep holes 102 and 104, respectively.

The proximal end 86 of the actuator rod 84 extends through a centrally-disposed aperture 90 in the diaphragm 74 and terminates in a pressure plate 92 which engages the compression spring 82. The pressure plate 92 comprises a substantially flat portion 94 engaging one end of the spring 82 and a tubular or frustoconical stem 96 extending coaxially with the axis of the spring 82. The stem 96 is press-fit onto the proximal end 86 of the actuator rod 84 such that the pressure plate 92 and the actuator rod 84 form an integral unit. An annular recess 98 in an end wall of the housing section 68 serves as a seat for the spring 82 and also provides rigidity to the end wall against the force of the spring 72. The annular recess 98 is provided with weep holes 100.

The distal end 88 of the actuator rod 84 extends through a central opening 106 in an end wall of housing section 66, sealed by an O-ring 108, through the coaxial cylindrical sleeve 38 of the service pressure plate 36 and into the internal chamber 60 of the sleeve 50. The O-ring 108 seals the second service brake chamber 31 from the first spring brake chamber 76. An O-ring 109 in the sleeve 38 seals the inner chamber 30 from the service brake chamber 31. The distal end 88 of actuator rod 84 terminates in a reaction plate 110 provided with an annular seat 112 which wholly closes the distal end 88 of the actuator rod 84. The end of the reaction plate 110 abuts the plug 56 when both the emergency and service brakes are not engaged. The reaction plate 110 includes spacer flanges 114 which define an annular groove which holds a low friction wear band 115 made from Teflon, Delrin or the like which center the reaction plate 110 and, in turn, the actuator rod 84 within the chamber 60 of the sleeve 50 of the push rod actuator 18. An annular gap 116 is thereby defined which has an inner limit defined by the actuator rod 84 and an outer limit defined by the sleeve 50 of the push rod actuator 18.

The actuator rod 84 preferably accommodates a brake release caging rod 118 disposed coaxially therein and having a first end 120 and a second end 122. The first end 120 extends through a coaxial bore in the stem 96 of the pressure plate 92 and through a coaxial aperture in an end wall of the housing portion 68 coaxial with the annular recess 98. The second end 122 of the caging rod 118 mounts an enlarged plate 124. The caging rod 118 is used to manually release the spring brake or to ensure that the compression spring 82 will remain compressed (or caged) when maintenance functions are performed on the brake assembly.

Figure 2:
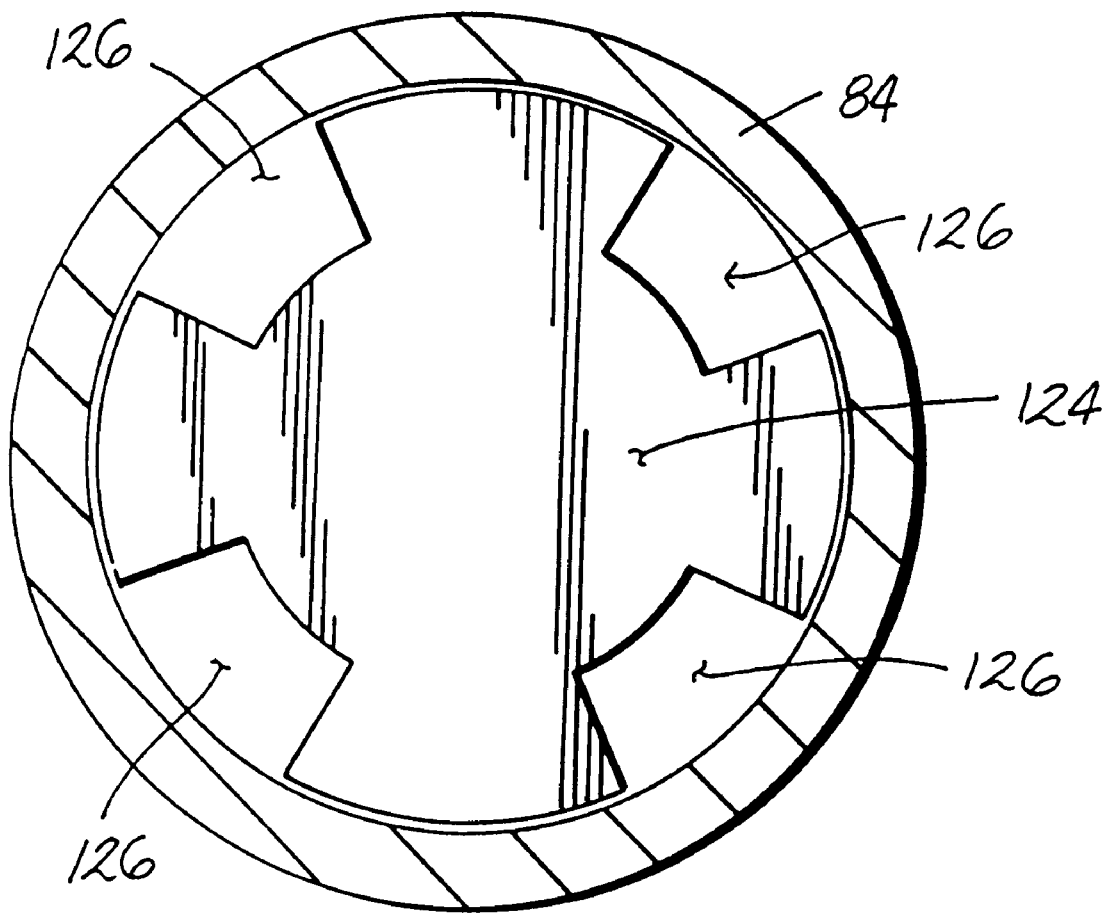
FIG. 2 is a cross-sectional view of a caging rod head of the spring brake actuator taken along lines 2—2 of FIG. 1.

As seen in FIG. 1 and in greater detail in FIG. 2, the plate 124 has an outer diameter which generally corresponds to, or just slightly less than, the inner diameter of the actuator rod 84. The plate 124 also includes several axial slots or passages 126 disposed at intervals around the plate 124 and extending radially inwardly from the circumferential edge thereof.

It will be understood that the caging rod 118 preferably is a bolt or the like threaded into a fixed threaded opening such as the threaded collar 128 mounted, such as by welding, to the end wall of housing section 68 coaxial with the annular recess 98. A hex-head nut 130 is fixedly attached to the first end 120 of the caging rod 118 to facilitate threading the rod 118 into and out of the spring brake 14 by a common wrench or the like.

An inwardly directed annular shoulder 132 is provided on the stem 96 of the pressure plate 92 to provide positive engagement with the proximal end 86 of the actuator rod 84 when the actuator rod 84 is actuated and further serves as an engagement surface for the plate 124 on the second end 122 of the caging rod 118 against which the plate 124 will bear when the caging rod 118 is withdrawn. Upon withdrawal, the caging rod 118 retains the compression spring 82 in its compressed or caged state. Otherwise, the caging rod 118 extends toward the distal end 88 of the actuator rod 84 by a sufficient distance to allow the actuator rod 84 to extend its full length of travel without engagement between the shoulder 132 and the plate 124 of the caging rod 118.

FIG. 1 further shows a filter assembly 134 mounted to the end wall of housing section 68 coaxial with the annular recess 98 which covers the weep holes 100 therein. The filter assembly 134 defines a tortuous air path for ingress to and egress from the second spring brake chamber 78 which collects particles and other contaminants therein. The filter assembly 134 generally comprises a frame which houses a gas permeable filter and is described in greater detail in a commonly-assigned application entitled "Spring Brake Actuator with Filtered Vent Openings," International Application No. PCT/US95/02151, filed on Feb. 21, 1995. The filter assembly 134 effectively requires all of the air entering and exiting the chamber 78 through the weep holes 100 to go through the filter assembly 134, while simultaneously protecting the filter contained therein and the openings from dirt, debris, ice accumulation, paint, and the like. It will be understood that as air is drawn into the chamber 78 when the spring 82 expands, contaminants in the atmosphere will be trapped by the filter assembly 134. Conversely, as air is expelled from the chamber 78 when the pressure plate 92 is retracted, it is forced back through the filter assembly 134 and will effectively clean it, expelling the contaminants into the atmosphere. Thus, the chamber 78 is maintained substantially free of contaminants, regardless of operation of the spring brake 14.

During normal operation of the brake actuator 10, the actuator rod 84 will be in the fully retracted position, as depicted in FIG. 1, by means of compressed air which is introduced through air port 80 in housing section 66 and maintained in the first spring brake chamber 76. To operate the service brake 12, compressed air is introduced through an air service port in housing section 22 (not shown) into the second service brake chamber 31 to force the diaphragm 32 and the pressure plate 36 against the force of the spring 48 to actuate the push rod actuator 18.

As the diaphragm 32 is actuated, any fluid in the first service brake chamber 30 is compressed and urged through the weep holes 62 in the sleeve 50 of the push rod actuator 18. The compression of the fluid in the first service brake chamber 30 causes the fluid traveling through the weep holes 62 in the sleeve 50 to pass through the gap 116, further through the weep holes 104 at the distal end 88 of the actuator rod, and into the interior thereof. The fluid then travels toward the proximal end 86 of the actuator rod 84. If and when the fluid encounters the plate 124 on the second end 122 of the caging rod 118, it passes by the plate 124 through the passages 126. The fluid then exits the proximal end 86 of the actuator rod 84 and into the second spring brake chamber 78 through the weep holes 102. The fluid exits the second spring brake chamber 78 through the weep holes 100 in the annular recess 98 and into the filter assembly 134.

When the compressed air is exhausted from the first spring brake chamber 76, the compression spring 82 forces the pressure plate 92 and the actuator rod 84, integrally attached to the pressure plate 92, in the direction of the brake push rod 18 of the service brake 12. The force of the spring 82, when released, causes the actuator rod 84 to be extended through the central opening 38 which, in turn, causes the reaction plate 110 to apply a force to the plug 56. This action causes the service brake push rod 18 and actuator rod 58 to be actuated and the brake to be applied. When the emergency brake is to be released, compressed fluid is once again introduced into the first spring brake chamber 76. The force of the compressed fluid against the diaphragm 74 urges the pressure plate 92, the actuator rod 84, and the spring 82 toward the retracted position depicted in FIG. 1. As the spring 82 is retracted, fluid flows through the gap 116 in a reverse direction from that described earlier as well as out the filter 134 via weep holes 100.

It will be understood that mounting studs 136 are provided to mount the brake actuating unit 10 onto a vehicle.

Figure 3:
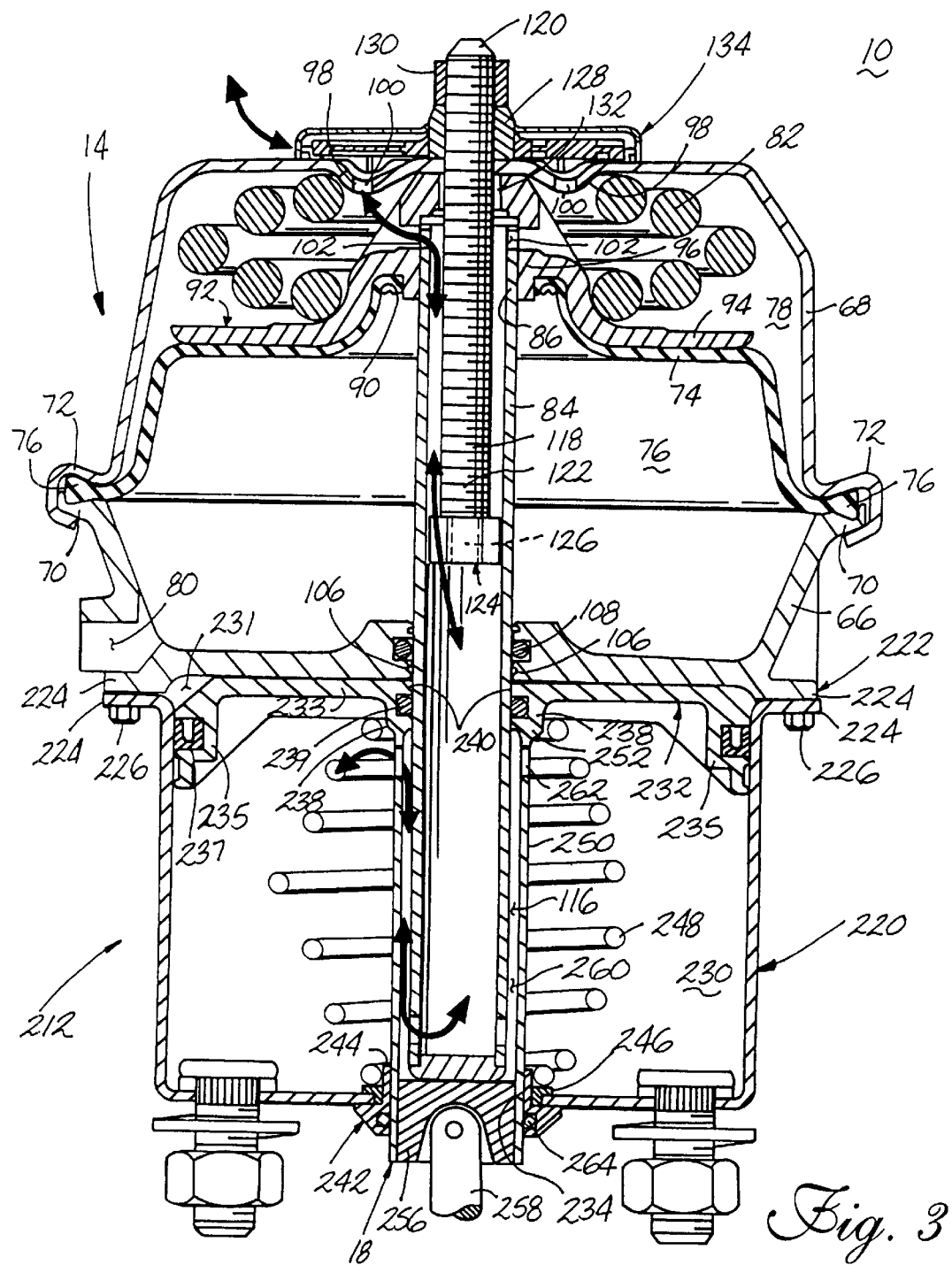
FIG. 3 is a cross-sectional view of a piston-type spring brake actuator with an internal breathing conduit according to the invention.

FIG. 3 shows a cross-sectional view of a second embodiment of an air-operated brake actuating unit 10 having a general configuration well known in the art and modified according to the teachings of this invention. It will be understood that FIG. 3 contains some reference numerals in common with those of FIG. 1 to denote similar components or features between the embodiments shown in each figure. It will be further understood that the reference numerals in FIG. 3 are greater by 200 than those of FIG. 1 to denote components or features of the second embodiment. The second embodiment of the actuating unit 10 comprises a service brake portion 212 mounted in tandem to a spring brake or emergency brake portion 14. A service brake push rod 218 extends from the service brake 212 for application of a conventional brake assembly as in the previous embodiment.

In this embodiment, the service brake 212 is a piston-type brake which comprises a pair of facing cup-shaped housing sections 220 and 222, each having an outwardly directed flange edge 224. The housing sections 220, 222 are clamped together at their flange edges 224 by means of a fastener 226 to form a first service brake chamber 230 and a second service brake chamber 231 on either side thereof. A piston 232 is suspended within the inner chamber 230 and comprises a plate 233 having a wall 235 extending from an outer radial edge of the plate 233 and a stem 238 having a coaxial bore 240 therethrough. Elastomeric sealing members 237 and 239 can be located in grooves in an outer surface of the wall 235 and an inner surface of the stem 238 to provide a sealing abutment against an inner wall of the housing portion 220 and an actuator rod 84. The housing section 220 is provided with a central opening 234 therein. The service brake push rod 218 extends through the opening 234 in housing section 220 and into the first service brake chamber 230 where it terminates at the stem 238 of the piston 232. A push rod guide 242 is disposed around the central opening 234 and comprises a sleeve 244 having a radially-extending flange thereon which forms a spring seat 246. A compression spring 248 extends between the stem 238 of the piston 232 and the spring seat 246 of the push rod guide 242. The push rod guide 242 acts to center the spring 248 around the opening 234.

The service brake push rod 218 comprises an elongated cylindrical sleeve 250 having a first end 252 and a second end 254. The first end 252 of the service brake push rod 218 extends from the stem 238 of the piston 232. The sleeve 250 can be formed integrally as part of the piston 232. The second end 254 of the service brake push rod 218 is mounted within the sleeve portion 244 of the push rod guide 242 and extends through the central opening 234. The second end 254 is closed off by a plug 256 which can mount a pivotable actuator rod 258. The actuator rod 258 can be mounted to a brake assembly (not shown). The sleeve 250 defines an internal chamber 260. The first end 252 further includes several weep holes 262 disposed adjacent the stem 238 of the piston 232. An O-ring 264 can be located between the push rod guide 242 and the sleeve 250 to provide a seal therebetween. The spring 248 thus tends to urge the piston 232 and the service brake push rod 218 to a fully retracted position as shown in FIG. 3.

The spring brake 14 is configured and shown with identical reference numerals as in the first embodiment shown in FIG. 1 and is not described further below except to note that discussion follows with reference to the reference numerals which describe the spring brake 14.

During normal operation of the brake actuator 10, the actuator rod 84 is in the fully retracted position, as depicted in FIG. 1, by means of compressed air which is introduced through air port 80 in housing section 66 and maintained in the first spring brake chamber 76. To operate the service brake 212, compressed air is introduced through an air service port in housing section 222 (not shown) into the second service brake chamber 231 to force the piston 232 against the force of the spring 248 to actuate the push rod actuator 218. The piston 232 can thereby slide coaxially about the actuator rod 84.

As the piston 232 is actuated, any fluid in the first service brake chamber 230 can be compressed and can travel through the weep holes 262 in the sleeve 250 of the push rod actuator 218. The compression of the fluid in the first service brake chamber 230 causes the fluid traveling through the weep holes 262 in the sleeve 250 to pass through the gap 116 and travel out of the brake actuator 10 through the filter assembly 134 as previously described.

The invention encompasses other variations and modifications not illustrated in the drawings, but clearly evident to one skilled in the art. It will be understood that other variations and modifications of the foregoing embodiments may be devised by those skilled in the art without departing from the scope of the invention as defined by the appended claims.

We claim:

1. In a brake actuator for a vehicle comprising:
    a spring brake actuator housing and a service brake actuator housing;
    the spring brake actuator housing having a first movable member disposed therein, dividing the interior thereof into a first spring brake chamber and a second spring brake chamber and reciprocally movable therein in response to the delivery and exhaust of pressurized fluid to the first spring brake chamber;
    a spring disposed in the second spring brake chamber in a position to urge the first movable member to a first position wherein the first spring brake chamber is collapsed upon exhaust of pressurized fluid from the first spring brake chamber;
    the service brake actuator housing having a second movable member disposed therein, dividing the interior thereof into a first service brake chamber and a second service brake chamber and reciprocally movable therein in response to the delivery and exhaust of pressurized fluid to the second service brake chamber;

a hollow spring brake actuator rod operably connected to the first movable member; and a service brake actuator rod operably connected to the second movable member, and extending through the service brake actuator housing to connect a brake, the improvement wherein:

the service brake actuator housing is sealed and the spring brake actuator housing is sealed except for at least one filtered vent opening in the second spring brake chamber, the service brake actuator rod is hollow with an opening in communication with the first service brake chamber, and the hollow spring brake actuator rod is in communication with the second spring brake chamber and extends through the second movable member into communication with the service brake actuator rod, whereby to vent fluid from the first service brake chamber through the service brake actuator rod and the spring brake actuator rod when the second service brake chamber is pressurized.

2. The brake actuator of claim 1 wherein the second movable member has an aperture, the service brake actuator rod is anchored to the second movable member, and the spring brake actuator rod extends through the aperture into the service brake actuator rod.

3. The brake actuator of claim 2 wherein the service brake actuator rod is press-fit into the second movable member.

4. The brake actuator of claim 3 wherein the second movable member comprises a diaphragm mounted at a peripheral edge thereof to the service brake actuator housing.

5. The brake actuator of claim 4 wherein the second movable member further comprises a pressure plate, and wherein the service brake actuator rod is press-fit into the pressure plate.

6. The brake actuator of claim 5 and further comprising an O-ring seal disposed between the spring brake actuator rod and the second movable member.

7. The brake actuator of claim 2 and further comprising a plug disposed in an end of the service brake actuator rod.

8. The brake actuator of claim 7 wherein the spring brake actuator rod extends into the service brake actuator rod far enough to abut the plug and urge the service brake actuator to engage a brake when the first spring brake chamber is evacuated.

9. The brake actuator of claim 2 wherein the opening in the service brake actuator rod is located adjacent the second movable member.

10. The brake actuator of claim 9 wherein at least one weep hole is disposed in each end of the spring brake actuator rod whereby the at least one weep hole in each end of the spring brake actuator rod fluidly connects the interior of the service brake actuator rod with the second spring brake chamber.

11. The brake actuator of claim 10 and further comprising a caging rod mounted at a first end to the spring brake actuator housing and extending within the spring brake actuator rod, a second end of the caging rod having a plate thereon.

12. The brake actuator of claim 11 wherein the plate on the second end of the caging rod has at least one passage extending through it.

13. The brake actuator of claim 12 wherein the at least one passage in the plate is disposed inwardly from a peripheral edge of the plate.

14. The brake actuator of claim 1 wherein the service brake actuator rod is press-fit into the second movable member.

15. The brake actuator of claim 1 wherein the second movable member comprises a diaphragm mounted at a peripheral edge thereof to the service brake actuator housing.

16. The brake actuator of claim 1 wherein the second movable member further comprises a pressure plate, and wherein the service brake actuator rod is press-fit into the pressure plate.

17. The brake actuator of claim 1 and further comprising an O-ring seal disposed between the spring brake actuator rod and the second movable member.

18. The brake actuator of claim 1 wherein the second movable member is a piston mounted to the service brake actuator rod.

19. The brake actuator of claim 1 and further comprising a plug disposed in an end of the service brake actuator rod.

20. The brake actuator of claim 19 wherein the spring brake actuator rod extends into the service brake actuator rod far enough to abut the plug and urge the service brake actuator to engage the brake when the first spring brake chamber is evacuated.

21. The brake actuator of claim 1 wherein the opening in the service brake actuator rod is located adjacent the second movable member.

22. The brake actuator of claim 1 wherein at least one weep hole is disposed in each end of the spring brake actuator rod whereby the at least one weep hole in each end of the spring brake actuator rod fluidly connects the interior of the service brake actuator rod with the second spring brake chamber.

23. The brake actuator of claim 1 and further comprising a caging rod mounted at a first end to the spring brake actuator housing and extending within the spring brake actuator rod, a second end of the caging rod having a plate thereon.

24. The brake actuator of claim 23 wherein the plate on the second end of the caging rod has at least one passage extending through the plate.

25. The brake actuator of claim 24 wherein the at least one passage in the plate extends inwardly from a peripheral edge of the plate.

* * * * *